(12) United States Patent
Hausmann

(10) Patent No.: US 10,363,787 B2
(45) Date of Patent: Jul. 30, 2019

(54) ECCENTRIC ADJUSTER FOR ADJUSTING A CONNECTING POINT FOR A LINK OF A HUB CARRIER, AND HUB CARRIER COMPRISING THE ECCENTRIC ADJUSTER

(71) Applicant: Schaeffler Technologies AG & Co. KG, Herzogenaurach (DE)

(72) Inventor: Alexander Hausmann, Erlangen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 68 days.

(21) Appl. No.: 15/742,055

(22) PCT Filed: Jul. 20, 2016

(86) PCT No.: PCT/DE2016/200327
§ 371 (c)(1),
(2) Date: Jan. 5, 2018

(87) PCT Pub. No.: WO2017/020901
PCT Pub. Date: Feb. 9, 2017

(65) Prior Publication Data
US 2018/0201083 A1 Jul. 19, 2018

(30) Foreign Application Priority Data
Aug. 3, 2015 (DE) .................. 10 2015 214 721

(51) Int. Cl.
*B60G 7/00* (2006.01)
*F16H 1/06* (2006.01)
(Continued)

(52) U.S. Cl.
CPC .......... *B60G 7/006* (2013.01); *B60G 17/015* (2013.01); *B62D 17/00* (2013.01); *F16C 7/06* (2013.01);
(Continued)

(58) Field of Classification Search
CPC ................. B60G 7/006; B60G 17/015; B60G 2202/442; B60G 2204/62;
(Continued)

(56) References Cited

U.S. PATENT DOCUMENTS 4,811,969 A * 3/1989 Sugiyama .............. B60G 7/006
180/412
2011/0193302 A1* 8/2011 Horiguchi .............. B60G 7/006
280/5.521
(Continued)

FOREIGN PATENT DOCUMENTS

EP    2554408 A1    2/2013
EP    2565064 A1    3/2013
JP    2011230675 A  11/2011

*Primary Examiner* — Drew J Brown
(74) *Attorney, Agent, or Firm* — Reid A. Baldwin

(57) ABSTRACT

An eccentric adjusting unit is disclosed, for example, for adjusting a connection point for a control arm of a wheel suspension. The unit may include an electric motor and an eccentric gear section. The eccentric gear section may have an input shaft and an output shaft, wherein the input shaft is configured to be driven by the electric motor and the output shaft rotates eccentrically with respect to an output axis of rotation and can be in operative connection with the connection point or forms this connection point. The eccentric gear section may have a star wheel gear stage.

10 Claims, 3 Drawing Sheets

(51) Int. Cl.
*B60G 17/015* (2006.01)
*B62D 17/00* (2006.01)
*F16C 7/06* (2006.01)
*F16H 21/14* (2006.01)

(52) U.S. Cl.
CPC ............... *F16H 1/06* (2013.01); *F16H 21/14* (2013.01); *B60G 2200/18* (2013.01); *B60G 2200/46* (2013.01); *B60G 2200/462* (2013.01); *B60G 2200/464* (2013.01); *B60G 2200/4622* (2013.01); *B60G 2202/42* (2013.01); *B60G 2202/442* (2013.01); *B60G 2204/4191* (2013.01); *B60G 2204/62* (2013.01)

(58) Field of Classification Search
CPC ...... B60G 2204/4191; B60G 2200/464; B60G 2200/462; B60G 2200/46; B60G 2202/42; B60G 2200/4622; B60G 2200/18; F16H 21/14; F16H 1/06; F16C 7/06; B62D 17/00

See application file for complete search history.

(56) References Cited

U.S. PATENT DOCUMENTS

| | | | | |
|---|---|---|---|---|
| 2015/0226250 A1* | 8/2015 | Luttinen | ................. | B60G 3/06 280/86.753 |
| 2017/0008360 A1* | 1/2017 | Kraus | .................... | B60G 7/006 |
| 2018/0178607 A1* | 6/2018 | Haeusler | ............... | B60G 7/006 |
| 2018/0258846 A1* | 9/2018 | Kamo | ..................... | F02D 15/02 |
| 2018/0320732 A1* | 11/2018 | Kim | ...................... | F02B 75/045 |

* cited by examiner

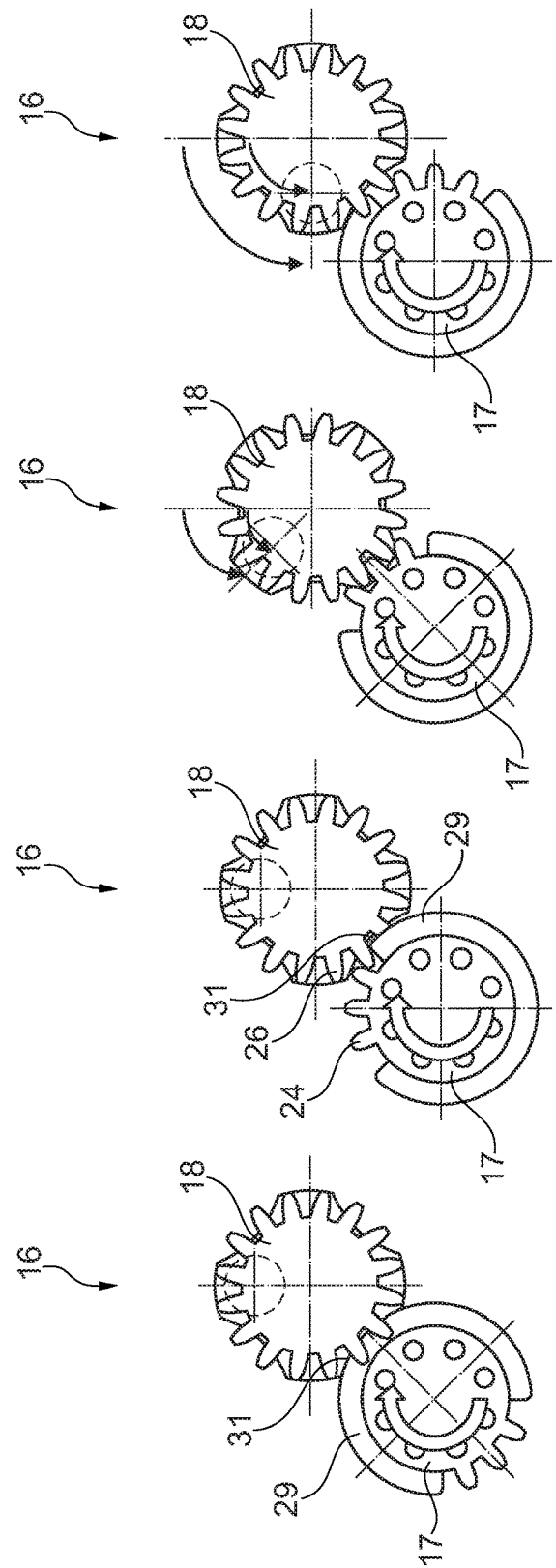

ECCENTRIC ADJUSTER FOR ADJUSTING A CONNECTING POINT FOR A LINK OF A HUB CARRIER, AND HUB CARRIER COMPRISING THE ECCENTRIC ADJUSTER

CROSS-REFERENCE TO RELATED APPLICATIONS

This application is the U.S. National Phase of PCT Appln. No. PCT/DE2016/200327 filed Jul. 20, 2016, which claims priority to DE 102015214721.5 filed Aug. 3, 2015, the entire disclosures of which are incorporated by reference herein.

TECHNICAL FIELD

The disclosure relates to an eccentric adjusting unit for adjusting a connection point for a control arm of a wheel suspension.

BACKGROUND

Wheel carriers in vehicles are conventionally held in a predetermined operating position in the chassis region via a multiplicity of control arms. The control arms here are constructed such that the predetermined operating position is adapted to the situation during a deflection or steering of the vehicle. However, it is not possible to find an optimal operating position for every driving situation with passive control arm arrangements. Instead, the passive control arm arrangements are optimized for a preferred driving situation, which means that the passive control arm arrangements are not optimally implemented for other driving situations.

To enable better resolution of this area of conflict for adapting the control arm arrangement to a multiplicity of driving situations, it is known to use active control arm arrangements having actuators which optionally actively alter the length of the control arms as such or alter the position of the connection points for the control arms in the chassis.

For example, printed document EP 256 506 4 A1 discloses a wheel suspension having an active control arm arrangement, wherein an eccentric device can be seen in FIG. 3, which has an electric motor and a gear unit having an eccentric output and which is designed to alter the position of a connection point for a control arm.

SUMMARY

It is an object of the present disclosure to propose an eccentric adjusting unit for adjusting a connection point for a control arm of a wheel suspension, which enables straightforward integration in the chassis.

This object may be achieved by an eccentric adjusting unit having the features described herein and by a wheel suspension having the features described herein. Multiple embodiments of the disclosure are revealed in the description below and the accompanying figures.

The subject matter of the disclosure is an eccentric adjusting unit, which is suitable for and/or designed for adjusting a connection point for a control arm of a wheel suspension. The control arm can be designed for example as a rod control arm, triangular control arm, trapezoidal control arm, trailing control arm, transverse control arm and/or semitrailing control arm. The wheel suspension can be realized as a non-controlled or a controlled wheel suspension. The connection point preferably refers to a coupling region for the control arm. The eccentric adjusting unit is in particular designed to alter the position of the connection point relative to a frame in which the eccentric adjusting unit is received in a stationary manner.

The eccentric adjusting unit has an electric motor which is designed for actively driving the eccentric adjusting unit. In one embodiment, the electric motor is associated exclusively with the eccentric adjusting unit.

The eccentric adjusting unit furthermore has an eccentric gear section. The eccentric gear section comprises an input shaft and an output shaft. The input shaft can be driven by the electric motor. The output shaft is arranged such that it can rotate eccentrically with respect to an output axis of rotation of the eccentric gear section. In particular, the output shaft is arranged parallel to the output axis of rotation and rotates about this. The output shaft is in operative connection with the input shaft via the eccentric gear section. The output shaft forms the connection point or is at least in operative connection with this connection point.

In principle, it is also possible that the input shaft is driven directly by the electric motor and is therefore connected in a torque-proof manner to a rotor shaft of the electric motor. However, it may be preferred that a gear unit, in particular a reduction gear unit, is interconnected between the input shaft and the electric motor, in particular the rotor shaft of the electric motor. Electric motors are usually designed for high rotational speeds, whereas the output shaft in the case of the eccentric adjusting unit usually only requires changes of a few revolutions of the output shaft about the output axis of rotation. It is therefore advantageous if the gear unit is arranged between the electric motor and the input shaft, which gear unit is preferably designed for high reduction.

The output shaft is driven via the eccentric gear section and in particular by the electric motor. The output shaft and input shaft are preferably arranged parallel to one another. In modified embodiments, it is also possible to arrange an angular gear section between the input shaft and the output shaft so that the input shaft and output shaft are arranged at an angle to one another.

Within the scope of the disclosure, it is proposed that the eccentric gear section has a star wheel gear stage. The star wheel gear stage is designed in particular as a stepping gear unit in the form of a gear train. The star wheel gear stage enables continuous rotational movements of the input shaft to be converted into intermittent rotational movements of the output shaft of the star wheel gear stage. A stepping gear unit refers in particular to a gear unit which converts a continuous rotational movement into the intermittent, step-wise rotational movement. Between the individual steps of the intermittent and step-wise rotational movement, there is a pause until the next step begins.

The advantage of using the star wheel gear stage is that the star wheel gear stage is secured with form fit in the pauses between the steps. Two functions which are normally implemented in parallel are thus combined in the eccentric adjusting unit, and more precisely the step-wise change in the position of the output shaft on the one hand and the form-fitting securing and/or fixing of the position of the output shaft as a result of the form-fitting locking of the star wheel gear stage on the other. It is thus achieved that a separate locking device for securing the output shaft in the desired position is not required. Nor is it necessary to implement the locking via friction fit or the like. As a result of integrating the two functions in the eccentric adjusting unit, it is possible to save on space and thereby simplify the integration of the eccentric adjusting unit.

In one design of the disclosure, the star wheel gear stage has a driving gear pair and a locking gear pair. In particular, the driving gear pair comprises a driving gear and a driven gear, which are in engagement with one another in phases and not in engagement with one another in phases. The locking gear pair furthermore comprises a driving locking gear and a driven locking gear which are in a locking state in phases and in an enabling state in phases.

In another design of the disclosure, the driving gear of the driving gear pair has a driving gearing which is, however, limited to a driving angular segment in the circumferential direction around the driving gear. The driving angular segment is preferably designed to be smaller than 180 degrees, in particular smaller than 90 degrees. The driven gear, on the other hand, has a circumferential, in particular uninterrupted, driven gearing. The driving gear is in operative connection with the input shaft or is connected to the input shaft in a torque-proof manner. The driving gearing meshes with the driven gearing, although the engagement only takes place in the region of the driving angular segment as seen in the circumferential direction. Therefore, for the angular region outside the driving angular segment, the driving gear rotates in idling mode with respect to the driven gear; the driven gear is driven only in the region of the driving angular segment. The step-wise further rotation of the driven gear with intermittent pauses is implemented by the driving gear pair. However, the driving gear pair do not secure the driven gear in a form-fitting manner when the driving gear and the driven gear are not in engagement. In this situation, the system is preferably able to re-position itself in a form-fitting securing state in the event of external influences (e.g. forces from the control arm on the driven gear).

It may be provided that the locking gear pair assumes the locking function, in particular the form-fitting locking function. The driving locking gear has a locking region in a locking angular segment in the circumferential direction and a freewheel region in a freewheel angular segment. For example, the locking angular segment is greater than 180 degrees, preferably greater than 270 degrees. The freewheel angular segment is greater than 45 degrees, preferably greater than 90 degrees.

The driven locking gear has a plurality of locking receiving means in the circumferential direction for receiving the freewheel region. The driven locking gear is in a locking state when the locking region is in engagement with one of the locking receiving means. On the other hand, the driven locking gear is in a freewheel state when the locking region is not in engagement with the locking receiving means and/or the freewheel region is facing the driven locking gear. The star wheel gear stage is locked with form fit when the locking gear pair is in the locking state and unlocked when the locking gear pair is in the freewheel state.

In one embodiment, the driving gear is arranged coaxially and in a torque-proof manner with respect to the driving locking gear and/or the driven gear is arranged coaxially and in a torque-proof manner with respect to the driven locking gear. Therefore, the driving gear and the driving locking gear form a common driving twin gear and the driven gear and the driven locking gear form a common driven twin gear.

In another design, the driving angular segment and the freewheel angular segment are congruent in an axial plan view. Alternatively or additionally, it is required that the star wheel gear stage is designed so that—whilst the driving gearing is in engagement with the driven gearing of the driving pair—the locking gear pair is in a freewheel state. On the other hand, it is provided that the locking gear pair is in a locking state when the driving pair is not in engagement, in particular when the driving gear is not in engagement with the driven gear. As a result of this design, it is achieved that the driven twin gear is rotated further in a step-wise manner and that the star wheel gear stage is secured with form fit in the pauses between the steps.

In a further development, the output shaft is arranged eccentrically with respect to the driven gear and/or the driven locking gear and/or the driven twin gear. The intermittent rotational movement of the driven gear and/or the driven locking gear and/or the driven twin gear is thus converted into an intermittent eccentric rotation of the output shaft. On the other hand, it is preferred that the input shaft is arranged coaxially with respect to the driving gear and/or the driving locking gear and/or the driving twin gear.

In another development of the disclosure, the eccentric adjusting unit comprises the control arm of the wheel suspension, wherein the output shaft forms the connection point for the control arm or the output shaft is in operative connection with the control arm. As a result of the further development, it is achieved that the intermittent eccentric rotational movement of the output shaft is converted via the connection point into a local offset or a displacement of the control arm.

In terms of the bearing technology, it is preferred that the driven gear, the driven locking gear and/or the driven twin gear are supported via a first radial bearing, in particular a radial rolling bearing. The eccentric adjusting unit optionally additionally has a bearing gear which is arranged coaxially with respect to the driven gear, the driven locking gear or the driven twin gear and on which the output shaft is likewise eccentrically mounted. It is provided that the bearing gear is supported in a second radial bearing, in particular a radial rolling bearing. The first radial bearing and the second radial bearing are preferably designed as a fixed/floating bearing.

A further subject matter of the disclosure is formed by a wheel suspension for a vehicle, which has an eccentric adjusting unit as claimed in one of the preceding claims. The wheel suspension may be designed as a multi-connecting-arm wheel suspension of a vehicle rear axle, wherein the eccentric adjusting unit is designed to alter the track of the vehicle rear axle via the control arm. The control arm is selected such that the turning circle of the vehicle is reduced, thereby facilitating parking and maneuvering at low vehicle speeds.

BRIEF DESCRIPTION OF THE DRAWINGS

Further features, advantages and effects of the disclosure are revealed in the description below of example embodiments of the disclosure and the accompanying figures, which show:

FIGS. 3 a,b,c,d are different phases in the operation of the star wheel gear stage of FIG. 2.

DETAILED DESCRIPTION

Figure 1:
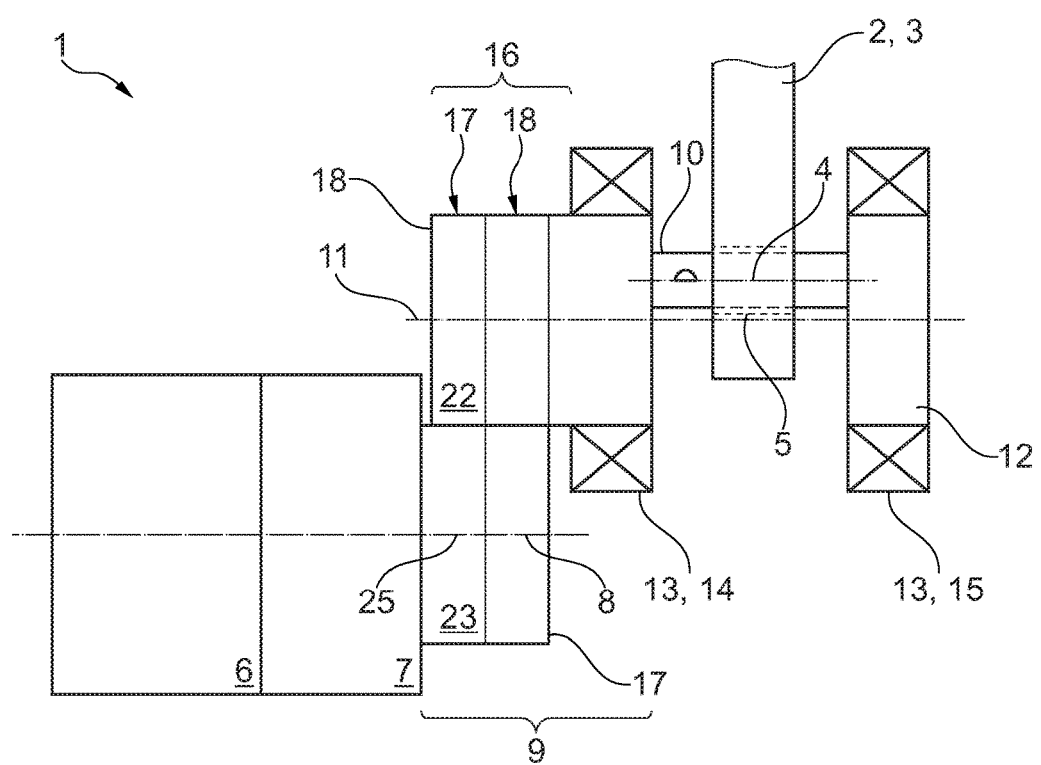
FIG. 1 is a schematic illustration of an eccentric adjusting unit as an exemplary embodiment of the disclosure.

FIG. 1 shows, in a highly schematized illustration, an eccentric adjusting unit 1 for adjusting a control arm 2 of a wheel suspension 3, in particular a multi-control-arm wheel suspension. For example, the eccentric adjusting unit 1 serves for the mechanical track adjustment of a vehicle rear axle in motor vehicles having a multi-control-arm wheel suspension in order to alter the turning circle, in particular to reduce the turning circle, and thereby facilitate parking and maneuvering at low vehicle speeds.

The eccentric adjusting unit 1 acts on the control arm 2 via a connection point 4 in order to manipulate said control arm and in particular alter its position and/or location. The control arm has a through-opening 5 for receiving the connection point 4.

The eccentric adjusting unit 1 is designed as an active actuator device having an electric motor 6. The electric motor 6 is in operative connection with a gear unit 7 which is designed as a reduction gear unit. The gear unit 7 converts a high rotational speed at the input of the gear unit 7 into a low rotational speed at the output of the gear unit 7. In the exemplary embodiment shown, the electric motor 6 and the gear unit 7 are arranged coaxially.

The output of the gear unit 7 is shown as an input shaft 8 into an eccentric gear section 9. An output shaft 10 of the eccentric gear section 9 rotates eccentrically with respect to an output axis of rotation 11 of the eccentric gear section 9. The output shaft 10 is guided through the through-opening 5 of the control arm 2 and manipulates the control arm 2 as a result of the eccentric rotational movement and thereby forms the connection point 4. In more general terms, the output shaft 10 is in operative connection with the control arm 2 as an eccentric via the connection point 4 in order to manipulate the control arm 2. The output shaft 10 is eccentrically supported in a bearing gear 12, which is arranged such that it can rotate coaxially with respect to the output axis of rotation 11. Via the bearing gear 12, the output shaft 10 is supported at the end which is remote from the eccentric gear section 9 and thus stabilized. The support is effected via a fixed/floating bearing 13, wherein an output section of the eccentric gear section 9 is supported via a first radial bearing 14 and the bearing gear 12 is supported via a second radial bearing 15.

The eccentric gear section 9 has a star wheel gear stage 16 which comprises a driving twin gear 17 and a driven twin gear 18. The driving twin gear 17 is arranged coaxially with respect to the input shaft 8 and/or with respect to the rotor shaft of the electric motor 6. The driven twin gear 18 is aligned parallel-offset from the input shaft 8 and coaxially with respect to the output axis of rotation 11. On the one hand, the star wheel gear stage 16 implements the function of rotating the output shaft 10 about the output axis of rotation 11 and, on the other hand, the function of holding the output shaft 10 with form fit in a selected position. On an output side of the driven twin gear 18, the output shaft 10 is arranged parallel-offset from the output axis of rotation 11 and/or eccentrically with respect to the output axis of rotation 11 and is moved about the output axis of rotation 11 by the output twin gear 18.

Figure 2:
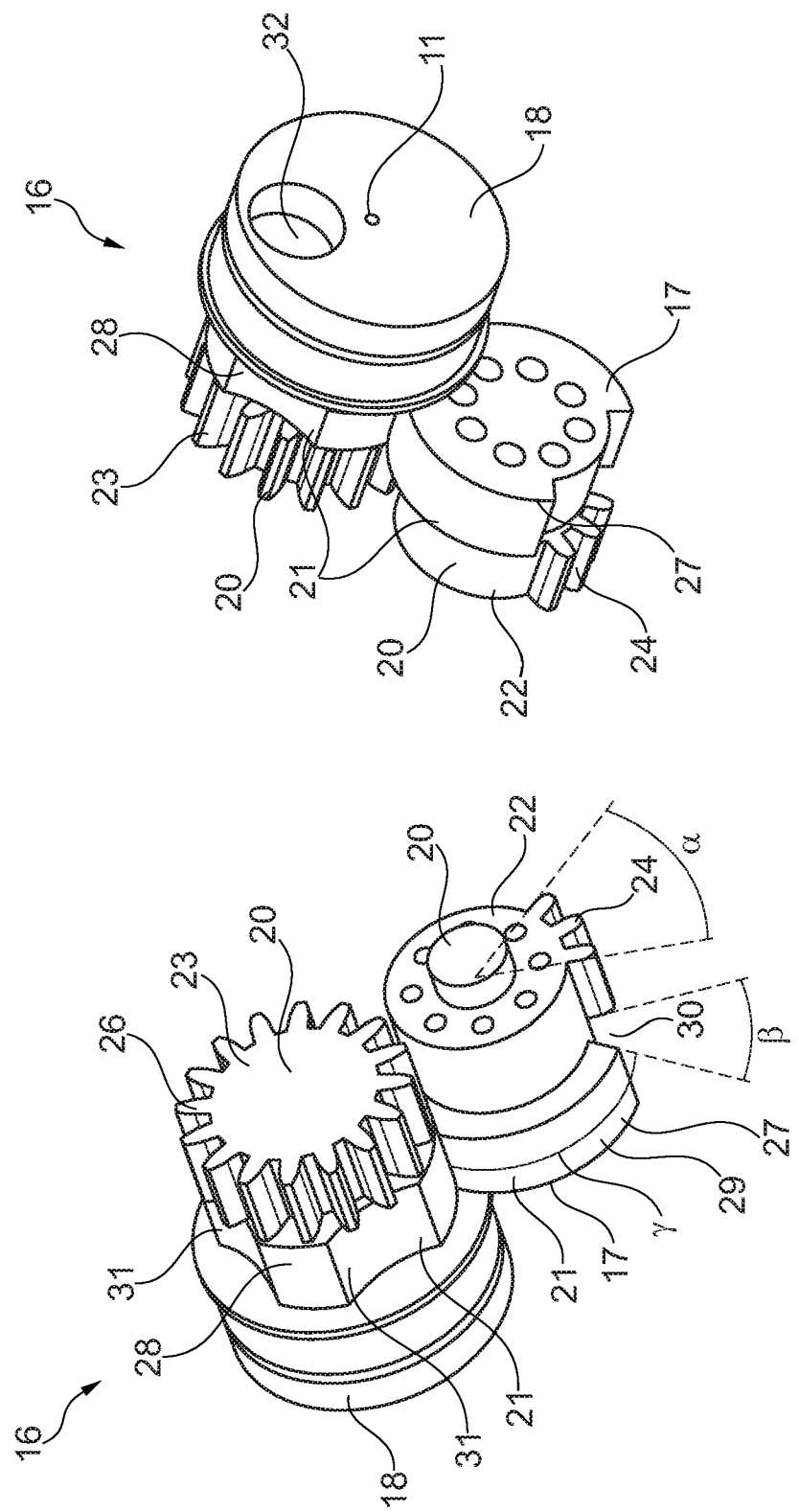
FIG. 2 is a three-dimensional illustration of a star wheel gear stage in the eccentric adjusting unit of FIG. 1.

FIG. 2 shows, in a schematic three-dimensional illustration, the star wheel gear stage 16 in two different views so that the individual regions can be seen uncovered. The star wheel gear stage 16 has the driving twin gear 17 and the driven twin gear 18. The driving twin gear 17 and the driven twin gear 18 form a driving gear pair 20 and a locking gear pair 21. The driving gear pair 20 implements the function of driving the output shaft 10, the locking gear pair implements the function of locking the position of the output shaft 10 with form fit.

The driving gear pair 20 has a driving gear 22 and a driven gear 23. The driving gear 22 is part of the driving twin gear 17, the driven gear 23 is a component of the driven twin gear 18. The driving gear 22 has a driving gearing 24, although this is limited to a driving angular segment alpha, which is limited in this example to ca. 60 degrees about an input axis 25. The remaining circumferential region of the driving gear 22 is set back with respect to the driving gearing 24 and is located in a pitch diameter which corresponds to the tooth base of the driving gearing 24 or is even set back further in the direction of the input axis 25. The driven gear 23, on the other hand, has a circumferential driven gearing 26. Depending on the angular position, the driving gearing 24 can engage in the driven gearing 26. Therefore, with a full revolution of the driving gear 22, the driven gear 23 is only rotated further through the angle defined by the engagement length of the driving gearing 24 in the driven gearing 26 in the circumferential direction.

The locking gear pair 21 has a driving locking gear 27 and a driven locking gear 28. The driving locking gear 27 can be divided in the circumferential direction into a locking region 29 and a freewheel region 30. The freewheel region 30 defines a freewheel angular segment beta, the locking region 29 defines a locking angular region gamma.

The driven locking gear 28, on the other hand, has a plurality of locking receiving means 31 which are distributed regularly in the circumferential direction and are designed complementarily to the locking region 29 so that the locking receiving means 31 can receive the locking region 29. In the exemplary embodiment shown, the locking region 29 is designed as a cylindrical region which is aligned coaxially with respect to the input axis 25. The locking receiving means 31, on the other hand, are designed as hollow cylindrical regions which have the same radius as the locking region 29, but are open radially outwards.

The driving angular segment alpha is arranged congruent to the freewheel angular segment beta in an axial plan view so that the star wheel gear stage 16 is switched to freewheel mode if the driving gearing 24 is in engagement with the driven gearing 26 and arrives in a locking state as soon as the driving gearing 24 and the driven gearing 26 move out of engagement.

The driven twin gear 18 furthermore has a bearing region 32 for supporting and driving the output shaft 10. The bearing region 32 is arranged eccentrically with respect to the output axis of rotation 11.

The star wheel gear stage 16 is shown in an axial plan view in different phases in FIGS. 3a-d. FIG. 3a shows a first phase in which the locking region 29 is arranged in one of the locking receiving means 31. The driven twin gear 18 is thus locked against rotation with form fit so that the output shaft 10 is also fixed in position with form fit. Upon a further rotation of the driving twin gear 17 by the electric motor 6, the locking region 29 is moved out of the locking receiving means 31 in a second phase, as shown in FIG. 3b. On the other hand, the driving gearing 24 moves into engagement with the driven gearing 26. In a third phase, the driven twin gear 18 is rotated according to FIG. 3b. As a result of the rotation of the driven twin gear 18, the output shaft 10 is moved eccentrically with respect to the output axis of rotation 11. As soon as the driving gearing 24 moves out of engagement with the driven gearing 26 in a fourth phase, as illustrated in FIG. 3d, the locking region 29 is rotated into the next locking receiving means 31 so that the star wheel gear stage 16, and therefore the output shaft 10, is locked again with form fit.

As a result of the star wheel gear stage 16, intermittent operation is therefore possible, wherein the output shaft 10 can be rotated further about the output axis of rotation 11 in a step-wise manner. Between the steps, the star wheel gear stage 16 is secured with form fit by the locking gear pair 21.

LIST OF REFERENCE SIGNS

1 Eccentric adjusting unit
2 Control arm

3 Wheel suspension
4 Connection point
5 Through-opening
6 Electric motor
7 Gear unit
8 Input shaft
9 Eccentric gear section
10 Output shaft
11 Output axis of rotation
12 Bearing gear
13 Fixed/floating bearing
14 First radial bearing
15 Second radial bearing
16 Star wheel gear stage
17 Driving twin gear
18 Driven twin gear
19 Idle
20 Driving gear pair
21 Locking gear pair
22 Driving gear
23 Driven gear
24 Driving gearing
25 Input axis
26 Driven gearing
27 Driving locking gear
28 Driven locking gear
29 Locking region
30 Freewheel region
31 Locking receiving means
32 Bearing region

The invention claimed is:

1. An eccentric adjusting unit for adjusting a connection point for a control arm of a wheel suspension, comprising:
an electric motor; and
an eccentric gear section, wherein the eccentric gear section has an input shaft and an output shaft, wherein the input shaft is configured to be driven by the electric motor and wherein the output shaft rotates eccentrically with respect to an output axis of rotation and can be in operative connection with the connection point or forms this connection point;
wherein the eccentric gear section has a star wheel gear stage.

2. The eccentric adjusting unit as claimed in claim 1, wherein the star wheel gear stage has a driving gear pair and a locking gear pair.

3. The eccentric adjusting unit as claimed in claim 2, wherein the driving gear pair has a driving gear having a driving gearing limited to a driving angular segment and a driven gear having a circumferential driven gearing which is in engagement with the driving gearing depending on an angular position of the driving gear.

4. The eccentric adjusting unit as claimed in claim 3, wherein the locking gear pair has a driving locking gear and a driven locking gear, wherein the driving locking gear has, in a circumferential direction, a locking region in a locking angular segment and a freewheel region in a freewheel angular segment and wherein the driven locking gear has a plurality of locking receiving features for receiving the freewheel region, wherein the driven locking gear is in a locking state when the locking region is in engagement with one of the locking receiving features and in a freewheel state when the locking region is not in engagement with the locking receiving features.

5. The eccentric adjusting unit as claimed in claim 4, wherein the driving gear is arranged coaxially and in a torque-proof manner with respect to the driving locking gear and/or the driven gear is arranged coaxially and in a torque-proof manner with respect to the driving locking gear.

6. The eccentric adjusting unit as claimed in claim 5, wherein the driving angular segment (alpha) and the freewheel angular segment (beta) are congruent.

7. The eccentric adjusting unit as claimed in claim 4, wherein the output shaft is arranged eccentrically with respect to the driven gear and/or with respect to the driving locking gear.

8. The eccentric adjusting unit as claimed in claim 4, wherein the input shaft is arranged coaxially with respect to the driving gear and/or with respect to the driving locking gear.

9. The eccentric adjusting unit as claimed in claim 1, wherein the eccentric adjusting unit comprises the control arm of the wheel suspension, wherein the control arm acts on the connection point and wherein the output shaft is in operative connection with the control arm via the connection point.

10. A wheel suspension for a vehicle, comprising an eccentric adjusting unit as claimed in claim 1.

* * * * *